US012669331B2

(12) United States Patent
Bina et al.

(10) Patent No.: US 12,669,331 B2
(45) Date of Patent: Jun. 30, 2026

(54) SYSTEM AND METHOD FOR MANUFACTURING AND MAINTENANCE

(71) Applicant: INTERAPTIX INC., Toronto (CA)

(72) Inventors: Bardia Bina, Toronto (CA); Dae Hyun Lee, Etobicoke (CA); Tyler James Doyle, Toronto (CA); Isaac Louis Gold Berman, Toronto (CA); Behzad Abghari, Toronto (CA)

(73) Assignee: INTERAPTIX INC., Toronto (CA)

( * ) Notice: Subject to any disclaimer, the term of this patent is extended or adjusted under 35 U.S.C. 154(b) by 709 days.

(21) Appl. No.: 18/001,417

(22) PCT Filed: Jun. 11, 2021

(86) PCT No.: PCT/IB2021/055172
§ 371 (c)(1),
(2) Date: Dec. 9, 2022

(87) PCT Pub. No.: WO2021/250631
PCT Pub. Date: Dec. 16, 2021

(65) Prior Publication Data
US 2023/0221709 A1 Jul. 13, 2023

Related U.S. Application Data

(60) Provisional application No. 63/107,040, filed on Oct. 29, 2020, provisional application No. 63/037,883, filed on Jun. 11, 2020.

(51) Int. Cl.
*G05B 19/00* (2006.01)
*G01C 21/00* (2006.01)
(Continued)

(52) U.S. Cl.
CPC ......... *G01C 21/165* (2013.01); *G01C 21/005* (2013.01); *G01C 21/206* (2013.01);
(Continued)

(58) Field of Classification Search
None
See application file for complete search history.

(56) References Cited

U.S. PATENT DOCUMENTS

| 8,798,926 B2 | 8/2014 | Stroila et al. |
| 8,855,404 B2 | 10/2014 | Doyle et al. |

(Continued)

FOREIGN PATENT DOCUMENTS

| EP | 1840834 A2 | 10/2007 |
| EP | 3351927 A1 | 7/2018 |

(Continued)

OTHER PUBLICATIONS

U.S. Appl. No. 17/345,764, Systems, Devices, and Methods for Quality Control and Inspection of Parts and Assemblies, filed Jun. 11, 2021.

(Continued)

*Primary Examiner* — Paul B Yanchus, III
(74) *Attorney, Agent, or Firm* — Perry + Currier Inc.

(57) ABSTRACT

A system and method for inspection maintenance and/or diagnosis of a variety of workpieces is provided. The system serves workers working on a workpiece, inspectors who are distal from the workers and/or can be used for remote training or for advanced diagnosis and/or repair. The system preferably includes a template of a set of one or more predefined required images of a workpiece required by an inspector to perform their inspection or diagnosis. The set of predefined required images is provided to the worker. The worker captures the images with an appropriate workpiece data capture device and provides them to the inspector for review. The inspector examines the provided images and either approves the workpiece based on their content, requests additional images for further examination and/or provides annotations and other information to the worker to (Continued)

address identified issues. The system maintains a database of all images and information.

17 Claims, 11 Drawing Sheets

(51) Int. Cl.
| | |
|---|---|
| *G01C 21/16* | (2006.01) |
| *G01C 21/20* | (2006.01) |
| *G05B 19/418* | (2006.01) |

(52) U.S. Cl.
CPC .................. *G05B 19/41875* (2013.01); *G05B 2219/32368* (2013.01)

(56) References Cited

U.S. PATENT DOCUMENTS

| | | | |
|---|---|---|---|
| 10,360,634 | B2 | 7/2019 | Lekas |
| 10,395,360 | B2 | 8/2019 | Kogawara |
| 10,672,089 | B2 | 6/2020 | Howe et al. |
| 10,762,511 | B1 | 9/2020 | Pope et al. |
| 11,036,984 | B1 | 6/2021 | Patangay |
| 11,132,479 | B1 | 9/2021 | Tyson, II |
| 11,203,425 | B2 | 12/2021 | Bauer et al. |
| 2008/0219543 | A1 | 9/2008 | Csulits et al. |
| 2014/0086464 | A1* | 3/2014 | Brockway ............... G06T 7/337 382/131 |
| 2014/0201094 | A1 | 7/2014 | Herrington et al. |
| 2015/0262391 | A1 | 9/2015 | Chau |
| 2015/0350553 | A1* | 12/2015 | Jana ....................... H04N 7/183 348/82 |
| 2016/0055602 | A1 | 2/2016 | Howe et al. |
| 2016/0282856 | A1* | 9/2016 | Wachs ............. G05B 19/41875 |
| 2016/0344877 | A1 | 11/2016 | Altamirano et al. |
| 2017/0018403 | A1* | 1/2017 | Koronel ................ H01J 37/244 |
| 2018/0002010 | A1 | 1/2018 | Bauer et al. |
| 2019/0215494 | A1 | 7/2019 | Oami et al. |
| 2019/0266718 | A1 | 8/2019 | Stancato et al. |
| 2019/0294975 | A1 | 9/2019 | Sachs |
| 2019/0295246 | A1 | 9/2019 | Smith et al. |
| 2020/0134911 | A1 | 4/2020 | van Hoff et al. |
| 2021/0096975 | A1 | 4/2021 | DeLuca et al. |
| 2021/0342770 | A1 | 11/2021 | Li et al. |

FOREIGN PATENT DOCUMENTS

| | | |
|---|---|---|
| EP | 4220087 A1 | 8/2023 |
| WO | WO-2018183709 A1 | 10/2018 |

OTHER PUBLICATIONS

U.S. Appl. No. 18/001,434, A System and Method for Remote Inspection of a Space, filed Dec. 9, 2022.

* cited by examiner

40

300

305
Define set of data to be captured

310
Capture data and forward to inspector station

315
Present captured data for inspection

320
Output inspection results

SYSTEM AND METHOD FOR MANUFACTURING AND MAINTENANCE

CROSS REFERENCE TO RELATED APPLICATIONS

This application claims priority to U.S. Provisional Application No. 63/037,883, filed Jun. 11, 2020 and U.S. Provisional Application No. 63/107,040, filed Oct. 29, 2020, the entirety of which are incorporated herein by reference.

FIELD OF THE INVENTION

The present invention relates to a system and method for manufacturing and/or maintaining products. More specifically, the present invention relates to a system and method for performing inspection and record keeping of the manufacture of products and/or the diagnosis and repair of products.

BACKGROUND OF THE INVENTION

In many fields of manufacture, such as aerospace, electronics, automotive, medical devices, etc., it is desired to inspect the results at stages of the manufacturing process to ensure correctness before continuing with subsequent stages of the manufacture. In these cases, a skilled inspector typically performs an inspection of the current state of the product being manufactured to verify the correctness of the manufacturing process to that point before allowing subsequent manufacturing stages to be performed.

While such inspection and verification processes are widely employed, problems exist with existing systems and methods. For example, each plant and/or assembly location requires a sufficient number of inspectors to be trained and to be present to perform the inspections. For products with long assembly times (such as for aerospace subsystems like landing gear, etc.) an inspector may be required to inspect an assembly stage of a product only once or twice a day. Thus, an expensive and highly trained individual may be underutilized for much of their time and each shift of workers will require inspectors to be present, thus multiple inspectors may be required, even though these inspectors are underutilized for much of their time.

Also, the requirement to have adequate numbers of trained inspectors available limits the ability to otherwise easily transfer product manufacturing between facilities to take advantage of temporarily under-utilized facilities or to meet increased demand for the product.

Further, in many fields of manufacture, it is necessary to record the specific components (typically identified by component serial numbers and/or batch numbers) which have been included in the manufacture of the product and in such cases, the person performing the assembly will record the relevant information for the product under assembly. Often, an inspector will attempt to subsequently verify that these component identifiers have been properly recorded, but this may prove to be difficult or impossible to confirm as the relevant identifiers may not be visible after the component has been included in a product assembly. Errors in the recording of component identifiers can lead to expensive and/or dangerous circumstances wherein a product subject to a safety recall will be erroneously omitted from the recall or, conversely, where a safe product will be erroneously recalled.

Similar problems to those described above occur when performing repairs or maintenance on complex products.

For example, the diagnosis of a fault on a complex product, such as an aircraft landing gear, may require the participation and insight of an expert on the product, while the actual necessary repair can be performed by a skilled technician. In such cases, the expert must be available at the maintenance/repair facility to make the diagnosis, after which the technician can make the necessary repairs.

Such experts can be expensive to train and are needed at each repair facility and such experts are also often underutilized as repairs requiring their expertise may be infrequent and thus the cost of maintaining such products can be adversely affected. Further, during the repair of such products, and during many normal maintenance operations, it is necessary to have inspectors review stages of the repair/reassembly, requiring the timely presence of inspectors, and it can be necessary to record serial numbers and/or lot numbers of components used in the repair or maintenance operation. As before, errors can easily occur in the recording of such numbers.

SUMMARY OF THE INVENTION

It is an object of the present invention to provide a novel system and method of manufacturing and maintenance which obviates or mitigates at least one disadvantage of the prior art.

According to a first aspect of the present invention, there is provided a system for inspection of a workpiece, comprising: a database to store at least one inspection template defining a set of data to be captured to inspect the workpiece; a workpiece data capture device communicating with the database, the workpiece data capture device to: receive the at least one inspection template from the database; capture, for a workpiece, the data defined in the at least one inspection template; and forward the captured data to the database; and an inspector station communicating with the database to send the at least one inspection template to the workpiece data capture device, the inspector station further to obtain the captured data from the database and present the captured data from the workpiece capture device for the inspection.

According to another aspect of the present invention, there is provided a method of inspecting a workpiece, comprising the steps of: defining a set of data to be captured to inspect the workpiece; capturing, at a workpiece data capture device, the data and forwarding the captured data to an inspector station; presenting the captured data at the inspector station to be inspected; and outputting inspection results, the inspection results comprising one of: additional data to be captured to complete inspection of the workpiece; and an approval of the workpiece.

The present invention provides a system and method for inspection maintenance and/or diagnosis of a variety of workpieces. The system serves workers working on a workpiece and inspectors who are distal from the workers and/or can be used for remote training or workers or for advanced diagnosis and/or repair. The system preferably includes a template of a set of one or more predefined required images of a workpiece under consideration which will be required by an inspector to perform their inspection or diagnosis, etc. The set of predefined required images is provided to the worker who captures them with an appropriate workpiece data capture device and the captured images are provided to the inspector for review. The inspector examines the provided images: approves the workpiece based on their content; requests one or more additional images to further examine aspects of the workpiece; and/or provides annotations and other information to the worker to address identified issues. The system maintains a database of all images and related information.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
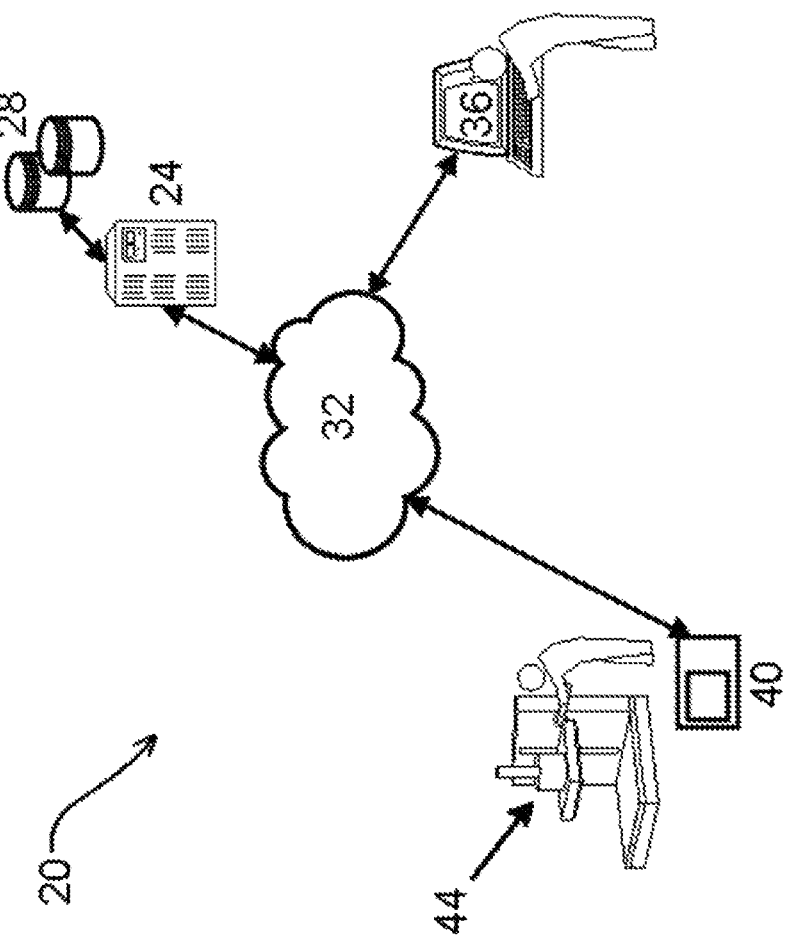
FIG. 1 shows a block diagram of a system in accordance with an aspect of the present invention.

A system for manufacturing and maintenance, in accordance with an aspect of the present invention, is indicated generally at 20 in FIG. 1. System 20 includes a computer server 24 which is connected to, or which includes, a database 28.

Computer server 24 can be any suitable computing device, such as a personal computer running the Linux operating system, an instance of a Microsoft Azure virtual machine, etc. Database 28 is operable to store and retrieve photographs, X-ray images, 3D computer models (e.g. SolidWorks™ CAD models or the like), videos, text records, depth information, annotations (as described below), serial numbers and part numbers, etc. and can be one or more instances of MySQL or any other suitable database as will occur to those of skill in the art. Database 28 stores at least one inspection template defining data to be captured to inspect a workpiece. The inspection templates may be specified based on a type of workpiece.

Computer server 24 is connected to a data communications network 32, which can be any suitable network such as the Internet or a private data network.

System 20 further includes at least one inspector workstation 36, which is also connected to network 32 and which executes user software, as described below, that communicates with server 24. Inspector workstation 36 can be a general purpose computing device, such as a personal computer running a suitable operating system such as Microsoft Windows or Linux, a tablet or handheld computer or any suitable other computing device as will occur to those of skill in the art.

System 20 further includes a workpiece data capture and user interface system (WDC) 40. WDC 40 can be a head-mounted augmented reality system, such as a Microsoft Hololens™, a camera equipped handheld device such as a smartphone or tablet, or can be a computing device and one or more cameras arranged about a station 44 where a workpiece is being assembled, inspected and/or repaired. The actual configuration of WDC 40 is not particularly limited and a variety of other possible configurations will be apparent to those of skill in the art in view of the discussion below. WDC 40 is also connected to server 24, as necessary, via data communications network 32.

As will also be apparent in view of the following discussion, the present invention provides an interactive process, between inspectors and workers, to allow the effective inspection and/or diagnosis and repair of manufactured workpieces. However, as will also be apparent, this interaction can be between users who are geographically dispersed, meaning that a worker can use system 20 at a first location to provide information to an inspector at the same location or at another location (perhaps in a different city or even a different country).

Further, the interaction can be synchronous or asynchronous in that an inspector can consider and/or respond to received information in real time, or can consider and/or respond at a subsequent time, as appropriate. Thus, a worker can be at the first location performing assembly and/or maintenance or repair of a workpiece while the inspector is located at the same location or, the inspector can be at a second location, perhaps in another country and/or time zone, and the inspector can respond when able.

It is contemplated that the present invention will allow for inspectors to be located at a limited number of locations while technicians and workmen can be at a variety of additional locations. Further, in the case that an inspector is not immediately available, a workman or technician at a location can capture and provide necessary and/or requested information (as discussed further below) to the inspector for subsequent consideration by the inspector when the inspector is available.

Figure 2:
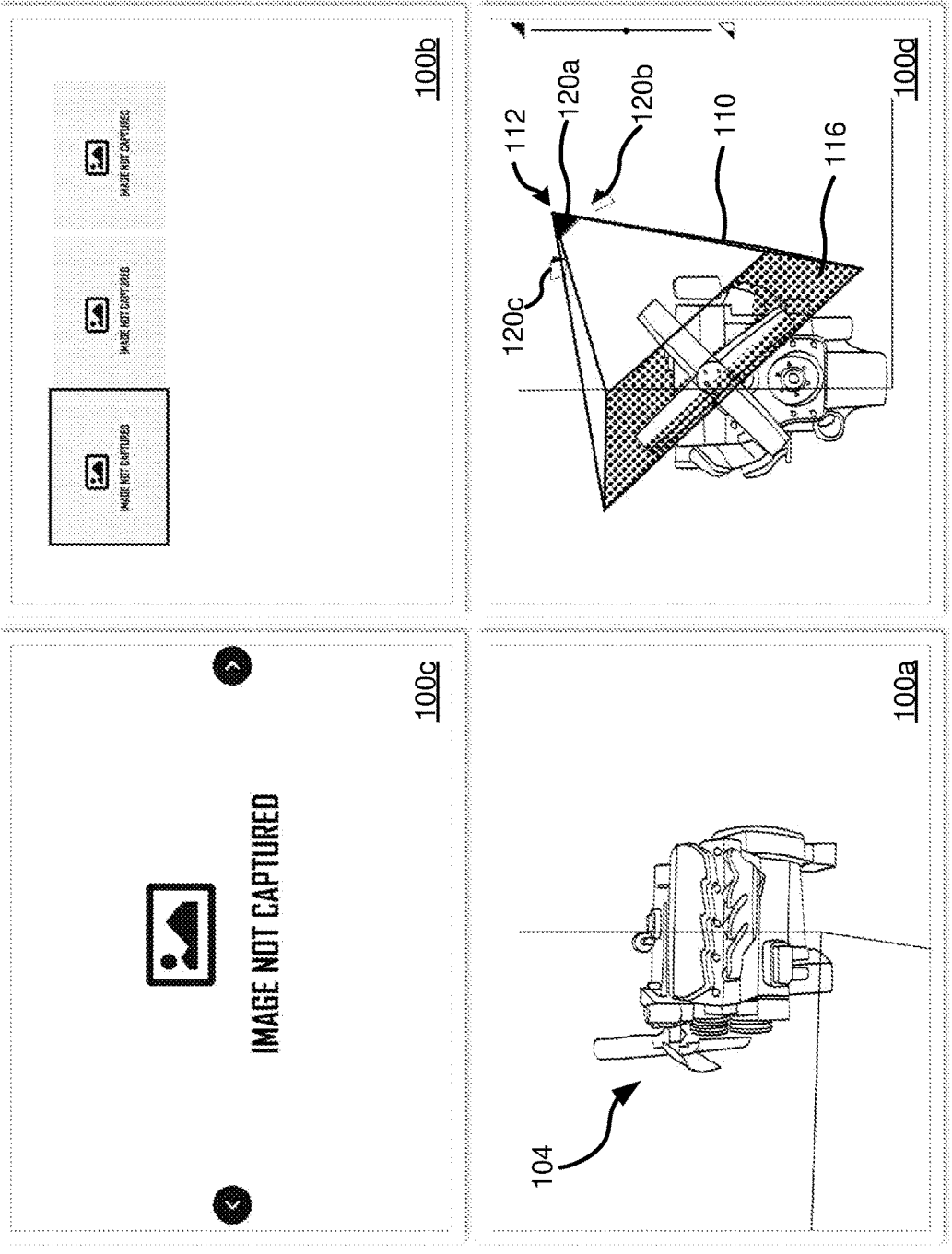
FIG. 2 shows a user interface for an inspector station in the system of FIG. 1.

Returning now to the discussion of the example embodiment of the present invention shown in the Figures, the user software at inspector workstation 36 provides a user interface, an example of which is shown in FIG. 2, for an inspector to access both predefined and acquired information about a workpiece captured by WDC 40. The user software can be a web browser which interacts with software running on computer server 24, or can be custom software executing on inspector workstation 26 and interacting, as needed, with computer server 24.

FIG. 2 shows the user interface of a current version of the system which is presented to the inspector at the start of the interaction, before any images have been captured for a workpiece under consideration.

Specifically, as shown in FIG. 2, inspector workstation 36 presents four interface panes 100 to an inspector. Model pane 100a shows a model 104 of the workpiece currently under consideration at station 44 (in this example, an internal combustion engine). Model 104 can be any suitable 3D model for the workpiece under consideration, such as a CAD model, 3D scanned image etc.

Library pane 100b displays a library of images captured or, as shown in FIG. 2, to be captured by the worker. Each workpiece to be processed within system 20 can have one or more predefined desired images which an inspector is expected to typically want to see (or which it is desired to keep a record of for other purposes). Further, one or more ad-hoc images can also be defined and included at any point of the inspection process which an inspector or the worker can also provide as desired, such as when diagnosing or repairing a workpiece.

It is contemplated that, for most inspection stages for a workpiece, it will be apparent which images would be useful for an inspector to perform their inspection. Thus, for any workpiece an inspector, or other person involved in the inspection process, can predefine a set of desired images for the worker to capture to start the inspection process, such as a top view, side view, etc. For clarity, the term "images" is used generically herein to represent and include any and all information which is useful for the inspection, maintenance and/or record keeping processes described herein. Specifically, "images" can include photographs (visible light, infra-red, X-ray, etc.), depth information, audio recordings, videos, text-based forms, etc. These sets of predefined desired images can be defined at specified locations relative to the workpiece (or model of the workpiece). The set of pre-defined desired images and the specified locations can be specified in the inspection template stored in the database 28. Each inspection template may additionally be associated with a particular type of workpiece. The inspection templates stored in the database 28 may also define at least two manufacturing stages or inspection steps for each workpiece type, as well as the data or images to be captured at each of the manufacturing stages or inspection steps.

Thus, each type of workpiece processed by system 20 can have a set of predefined images for each inspection stage which is to be performed on the workpiece. An inspector will typically commence the inspection process by selecting the appropriate type of workpiece (landing gear, internal combustion engine, pump, etc.) within system 20. Then the inspector will select the appropriate inspection stage for that selected workpiece to load the appropriate set of predefined desired images which are desired for the worker to capture for the workpiece being inspected, as defined in the inspection template, from database 28 into library pane 100*b* of inspector workstation 36. The selection of workpiece type and the inspection stage are not explicitly shown herein as such can be accomplished via a wide range of known techniques, such as drop down menus, menu trees, etc. as will be apparent to those of skill in the art.

In the example of FIG. 2, library pane 100*b* shows three pre-defined desired images, as indicated by the placeholder "Image not captured" icons 108*a*, 108*b* and 108*c*. Placeholder icons 108 are displayed because, at this point, no images have been captured with WDC 40 by a worker for the workpiece under inspection. Once corresponding images are captured, placeholder icons 108 are replaced with appropriate thumbnail representations of the captured images and the captured images are stored in database 28 in the records maintained for the workpiece being inspected.

It is contemplated that, in cases where it is desired to captured and/or verify a part number or serial number for a component or assembly at a manufacturing stage, a pre-defined desired image can be defined which will capture the desired serial or part number. Ideally, an image recognition algorithm will process each such captured image to recognize and extract the serial number of interest and to populate that number into an appropriate record in database 28.

When a placeholder icon 108 or an image thumbnail is selected by an inspector in library pane 100*b*, an image capture pane 100*d* is updated to provide an indication of the location where that image, or desired image, is or should be obtained from. A copy of the model used in model pane 100*a* is also shown in capture pane 100*d* and the model can be interactively rotated, resized or otherwise manipulated by the inspector, using known user interface techniques, to show the inspector the relationship between the workpiece (as represented by the model) and the camera of WDC 40 for each image (or desired image) of library pane 100*b*.

Specifically, as shown in the illustrated example of FIG. 2, a pyramid-shaped overlay 110 is shown in image capture pane 100*d* wherein the apex 112 of the pyramid indicates the location of the camera capturing the image and the base 116 of pyramid overlay 110 indicates the plane and view of the resulting captured image. In the illustrated example, pyramid apex 112 is positioned at a camera location corresponding to Image Not Captured Icon 108*a* and shows the inspector how the image associated with icon 108*a* will be captured. Capture pane 100*d* includes indicators 120 which correspond to the camera location and positioning for each image in library pane 100*b*, and as desired image 108*a* has been selected in library pane 100*b*, the apex 112 of pyramid 110 is located at the position indicated by indicator 120*a*. If the inspector next selects desired image icon 108*b*, apex 112 will be repositioned at corresponding location 120*b*, etc.

As mentioned above, if necessary the inspector can rotate and reposition their viewpoint of the model in image capture pane 100*d*, and pyramid overlay 110 will move correspondingly. In this manner, an inspector can easily and intuitively understand the positioning and orientation of the camera for each image to be captured and for those that have been captured.

Model pane 100*a* shows model 104 in an orientation, sizing, etc. which corresponds to how a properly captured image, obtained in accordance with the arrangement of capture pane 100*d*, should appear.

When an image has been captured, and its thumbnail is selected in library pane 100*b*, the image is displayed to the inspector in image pane 100*c*, as will be seen in the following discussion and the captured image can be compared to the expected image represented by model 104 in model pane 100*a*.

Image capture pane 100*d* also allows an inspector to define, on an ad-hoc basis, one or more additional images that the inspector may also wish the worker at station 44 to capture with WDC 40. The inspector can use model pane 100*a* to ensure that the definition of the ad-hoc desired image is exactly the view that they require to proceed. In such cases, the inspection station 36 generates an additional data capture request based on the current view of the model in the model pane 100*a*. The additional data capture request can define a location at which the image is to be captured, as well as an angle relative to the workpiece at which the image is to be captured. It is contemplated that such ad-hoc captured images will be of particular use for the diagnosis, repair and/or maintenance of workpieces, although it is also contemplated that they may be of use for manufacturing and assembly problems which arise unexpectedly and/or training and documentation purposes, etc.

Figure 3:
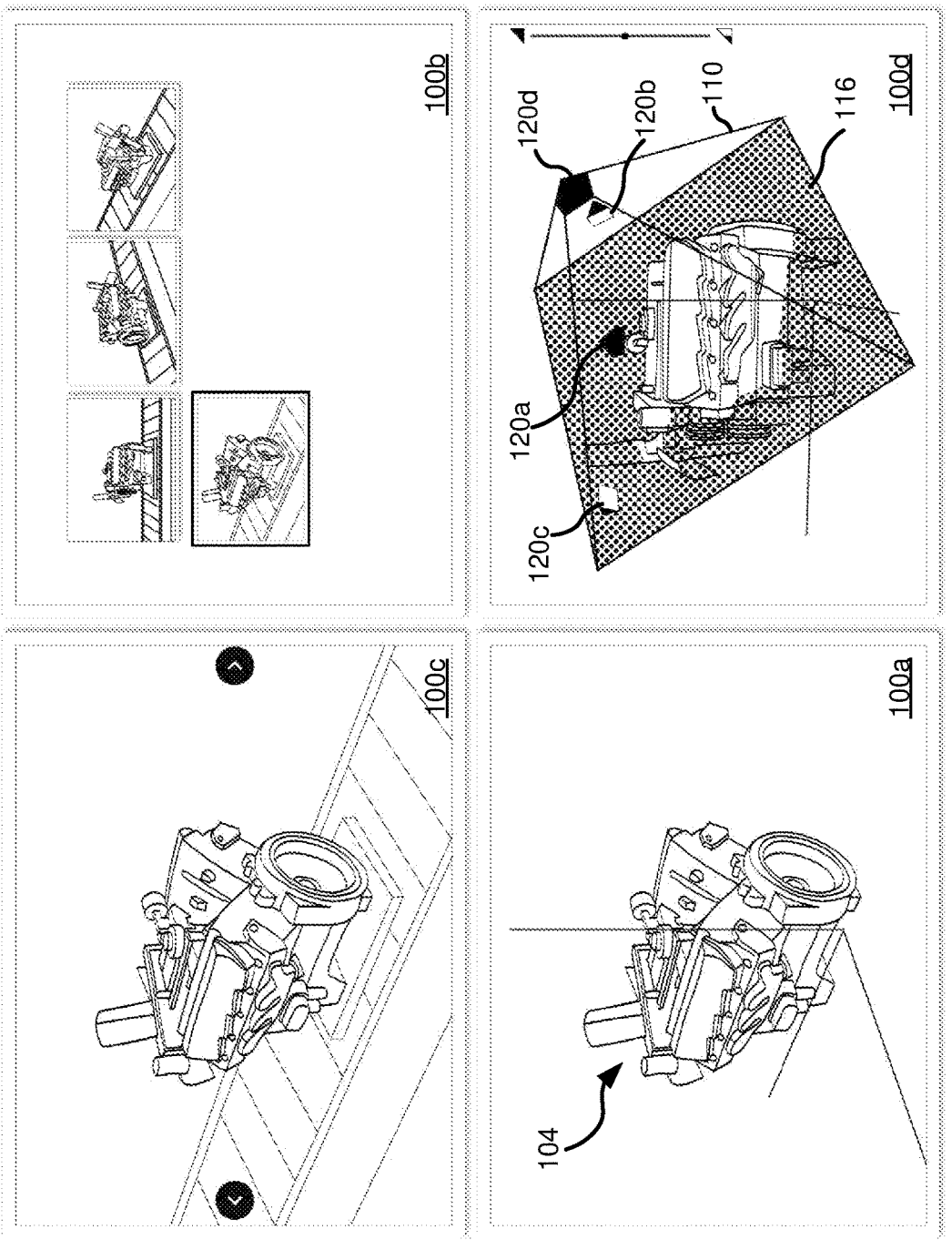
FIG. 3 shows another instance of the user interface of FIG. 2.

FIG. 3 shows another view of the user interface at inspector workstation 36, wherein the three predefined desired images shown in FIG. 2 have been captured by a worker with WDC 40 and the inspector has defined an ad-hoc image 108*d* which the worker has also now captured. As shown, each of the icons for predefined images 108*a*, 108*b*, 108*c* and for ad-hoc image 108*d* have been updated to be thumbnails of their corresponding images.

In the illustrated example, the inspector has selected thumbnail icon for ad-hoc image 108*d* in library pane 100*b*, and so image viewing pane 100*c* is displaying the corresponding captured image, model pane 100*a* is showing a view of the model which the captured image is expected to correspond to and capture pane 100*d* is showing the particulars of how the captured image was obtained, i.e.— the location, angle, distance the image was taken from.

At this point, the inspector can examine each captured image, zooming in or out and panning as desired, looking for assembly errors or other issues of concern and/or comparing the captured images to the expected view of the model shown in model pane 100*a* or images captured from previously inspected workpieces as necessary, in a similar manner to that which would be employed if the inspector where physically present at station 44. For each captured image in library pane 100*b* the inspector can immediately determine the location, angle and distance from which the selected image was taken, by looking at capture pane 100*d*, and image viewing pane 100*c* shows a full resolution view of the selected image.

While in the discussion above only images have been discussed, the present invention is not so limited. For example, in some circumstances such as inspections for diagnosing necessary repairs, it may be desired to capture one or more images of a workpiece with an infrared camera and system 20 supports such use. In such a case, WDC 40 will include a suitable infrared camera and the icons 108 used to represent these desired or captured images will include an appropriate indicator of the nature (e.g.— infrared) of the images. In other cases, WDC 40 may include, or be able to interface with, other sensors such as X-ray devices, audio recorders, depth data scanners, etc. and the resulting captured information will be stored in database 28 and available at inspector station 36.

Further, in other circumstances, such as for diagnosing movement of inter-related components, it can be desired to capture video of a workpiece. In such a case, WDC 40 can be provided with an appropriate video camera and icons 108 will include corresponding indicators of the category (i.e.— video) of the content, capture pane 100*d* can include an indication of the desired (for predefined view) or actual (or captured or ad-hoc) movement path of the video camera used to capture the video segment and model pane 100*a* will be animated to have model 104 move and be displayed corresponding to the captured video.

Figure 4:
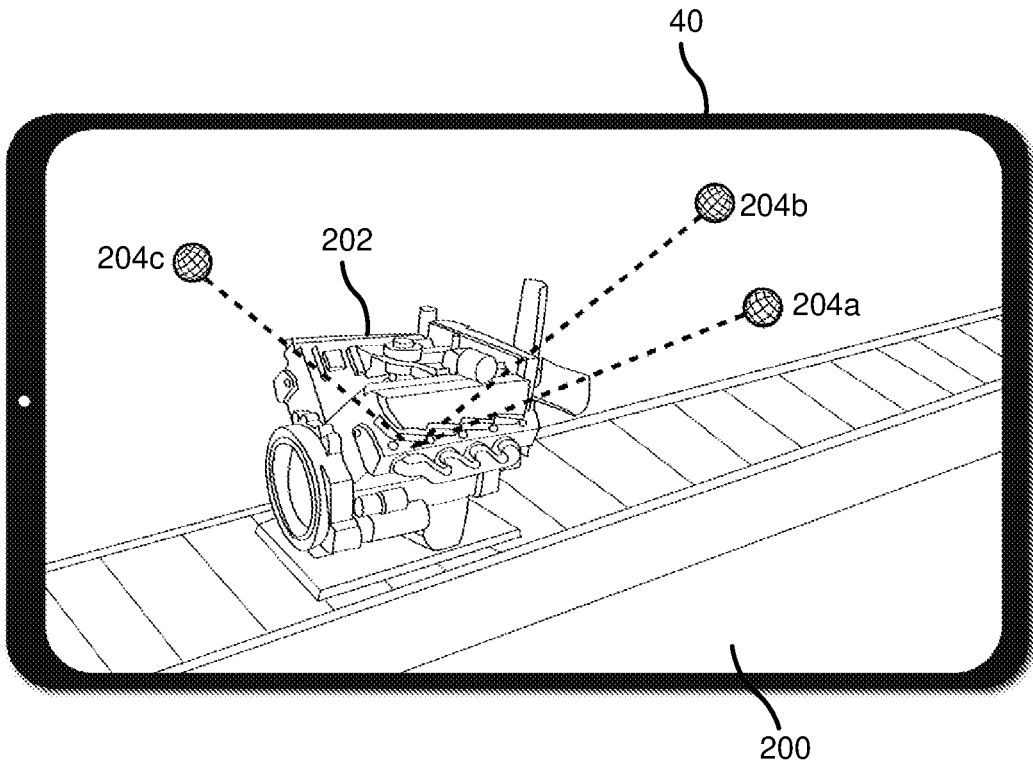
FIG. 4 shows a user interface of a workpiece data capture device of the system of FIG. 1.

FIG. 4 shows an example of the user interface presented on WDC 40. As mentioned above, WDC 40 can be any suitable device for capturing images, video, etc. and for presenting a suitable user interface to the worker operating WDC 40. In the example of FIG. 4, WDC 40 is a smartphone with a touch screen 200, but tablets, head mounted systems, etc. can be employed as desired. Also, in some cases WDC 40 can comprise a fixed inspection installation, for example a set of cameras located at fixed positions with respect to a workstand for a workpiece can be employed.

In FIG. 4, the worker has already selected an appropriate icon (not shown) to place WDC 40 into a mode wherein each of a set of desired images to be obtained (i.e., as defined in the inspection template) are shown to the worker. Specifically, a WDC 40 camera obtained image of the workpiece 202 under examination is displayed to the worker with camera position indicator icons 204, which are displayed as augmented reality items in the image of the workpiece being displayed to the worker on WDC 40. These camera position icons 204 indicate to the worker the general location and direction from which the worker is to capture the desired images. In FIG. 4 icon 204*a* corresponds to the predefined desired captured image 108*a* of FIG. 3, icon 204*b* corresponds to image 108*b*, etc.

Figure 5:
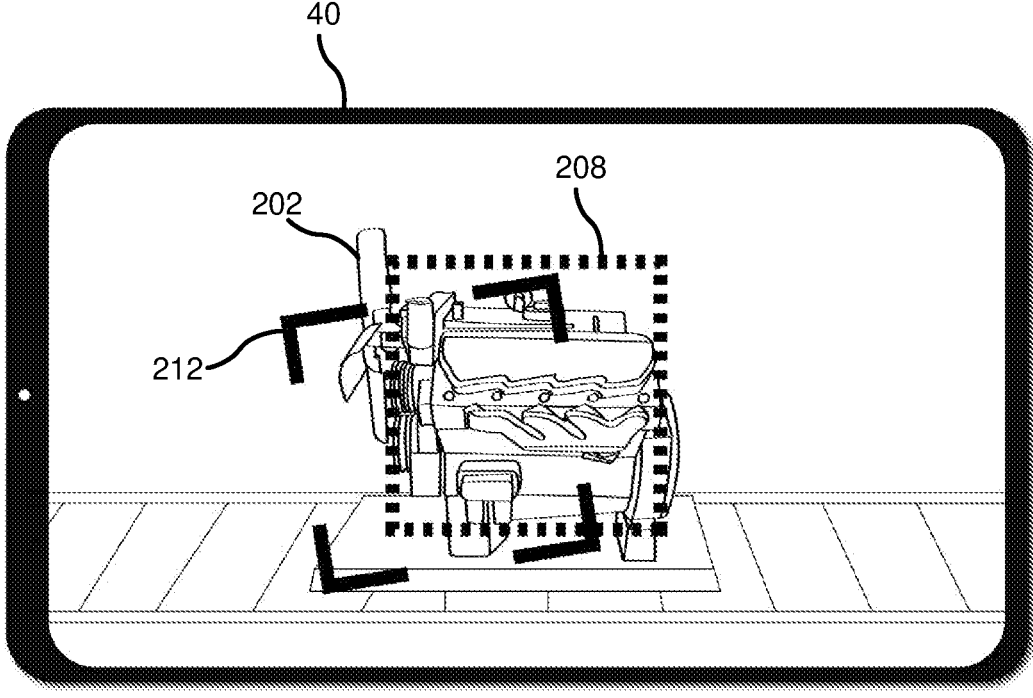
FIG. 5 shows an alignment mode user interface of the workpiece data capture device of FIG. 4.

Each camera position icon 204 is selected, in turn, by the worker to capture the requested image. Specifically, the worker moves WDC 40 into the general area represented by a camera position icon 204, such as icon 204*a*, and touch screen 200 is then put into a camera alignment user interface mode, as shown in FIG. 5.

The camera alignment user interface comprises a guide frame 212, which indicates the position the camera of WDC 40 needs to be at to acquire the requested image, and a current position indicator 208, which indicates the actual position of the camera in WDC 40. In particular, since the WDC 40 is located in the general area of the camera position icon, the guide frame 212 may indicate an angle at which the camera of the WDC 40 is to be oriented with respect to the workpiece in order to capture the requested image.

Guide frame 212 can be produced in a variety of manners as will occur to those of skill in the art. In a present embodiment of the invention, guide frame 212 is produced by WDC 40 using well known object tracking techniques for example, comparing model 104 to the image from the camera of WDC 40 of workpiece 202. Another method by which guide frame 212 can be produced is by using the known position and orientation of the camera location for the requested image and comparing the actual position and orientation of the camera on WDC 40 to known position and orientation. This latter technique requires WDC 40 to have an appropriate set of sensors, but such sensors are commonly provided on many computing devices, such as tablets, AR headsets, etc.

At this step, the worker moves WDC 40 until position indicator 208 aligns with guide frame 212 and the desired image is acquired. When position indicator 208 is aligned with guide frame 212, WDC 40 can automatically acquire the image or the worker can manually trigger the camera to acquire the image. When a desired image has been captured, WDC 40 returns to the display of FIG. 4 to allow the worker to identify the next camera position they are to move WDC 40 to.

Figure 6:
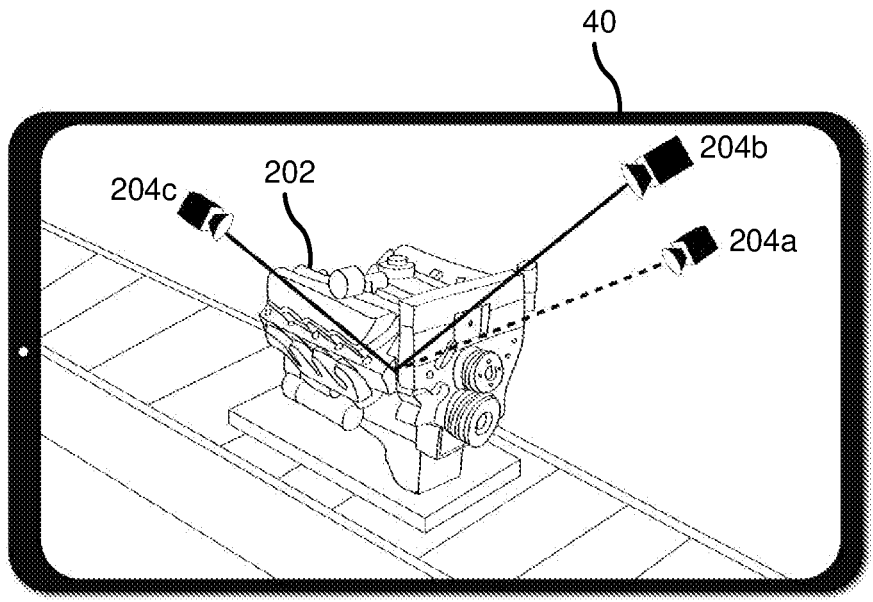
FIG. 6 shows another view of the user interface of the workpiece data capture device of FIG. 4.

When an image is captured, its corresponding camera position icon 204 is changed from a representation of an orb to that of a camera to provide a visual indicator to the worker that the image is properly captured. FIG. 6 shows the updated example of FIG. 4 wherein all three desired mages have been captured by the worker.

Once a worker has captured at least some of the requested images, an inspector can begin the inspection process for the workpiece. If the interaction between the inspector and the worker is occurring in real time, the inspector can review images as they are captured and/or request that the worker re-capture any images which are not satisfactory, or define one or more ad-hoc additional images to be captured by the worker. FIG. 3 shows an example of the information presented to the inspector at inspector station 36 once the requested images have been captured for the workpiece by WDC 40.

At this point: an inspector can be satisfied, based on the information provided, that the relevant inspection criteria have been met for this stage of the manufacturing process of the workpiece; the inspector can decide that more information is required and the inspector can define one or more additional ad-hoc images they wish the worker to obtain to update the information available; or the inspector can identify an assembly issue which the worker needs to address. The inspector station 36 can output inspection results including additional data to be captured to complete the inspection, annotations or other identified issues, or an approval of the workpiece.

If the inspector defines one or more ad-hoc images which are required to complete the inspection, inspector station 36, after generating at least one additional data capture request, sends the additional data capture request to server 24. Server 24 may communicate with WDC 40 to send the additional capture request to WDC 40. An indicator of the additional capture request is presented on WDC 40 to the worker, in a similar manner as the requested images defined in the inspection template. The worker would then repeat the image capture process described above to capture the requested ad-hoc images, after which the inspector would again review the updated information to make a determination of the status of the workpiece.

Figure 7:
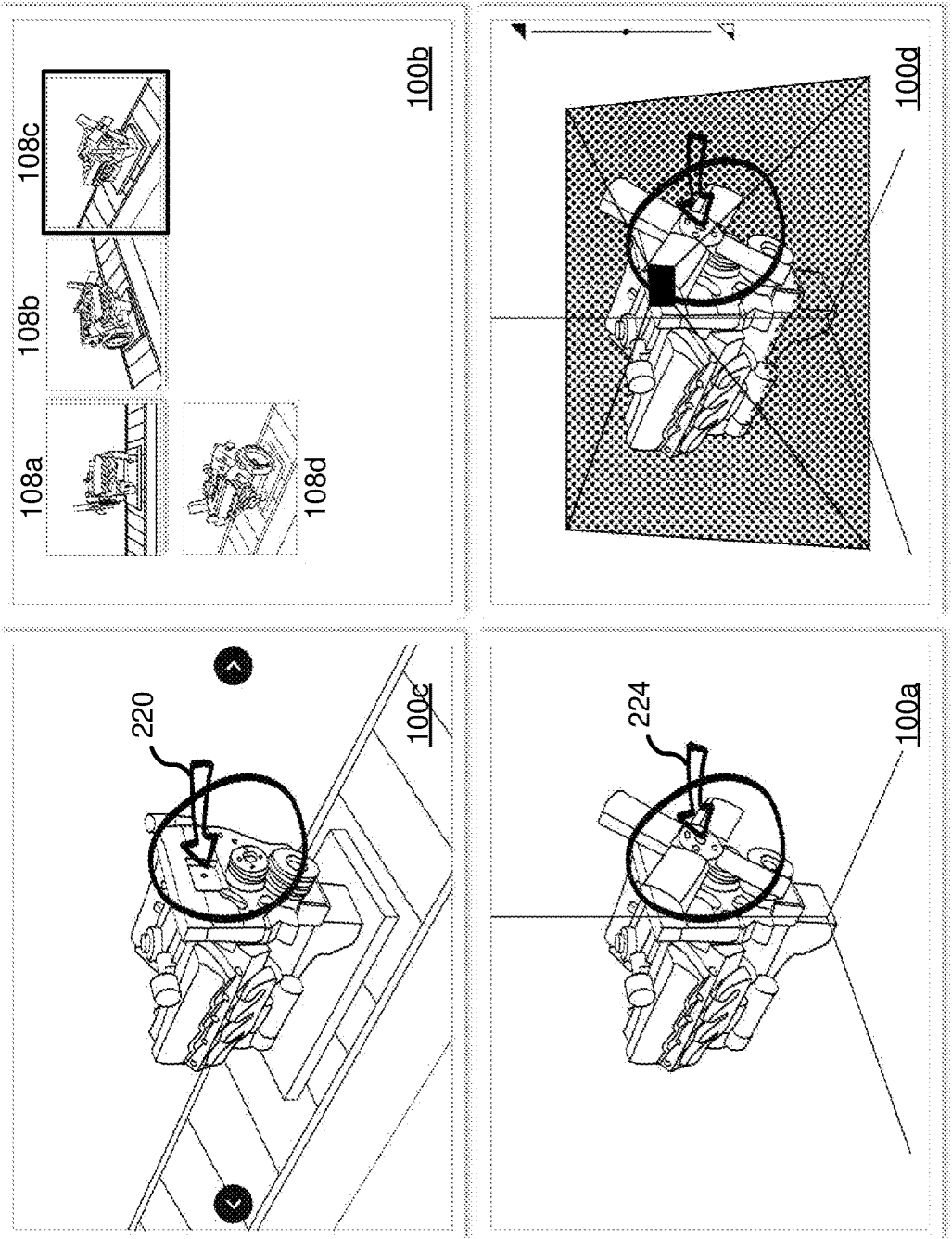
FIG. 7 shows another view of the user interface of the inspector station of FIG. 2.

If the inspector detects a manufacturing or assembly fault, the inspector can annotate the images, as shown in FIG. 7, to provide the necessary feedback and instructions to the worker. In the example of FIG. 7, the inspector has identified a missing component—a cooling fan—from the workpiece.

Figure 8A:
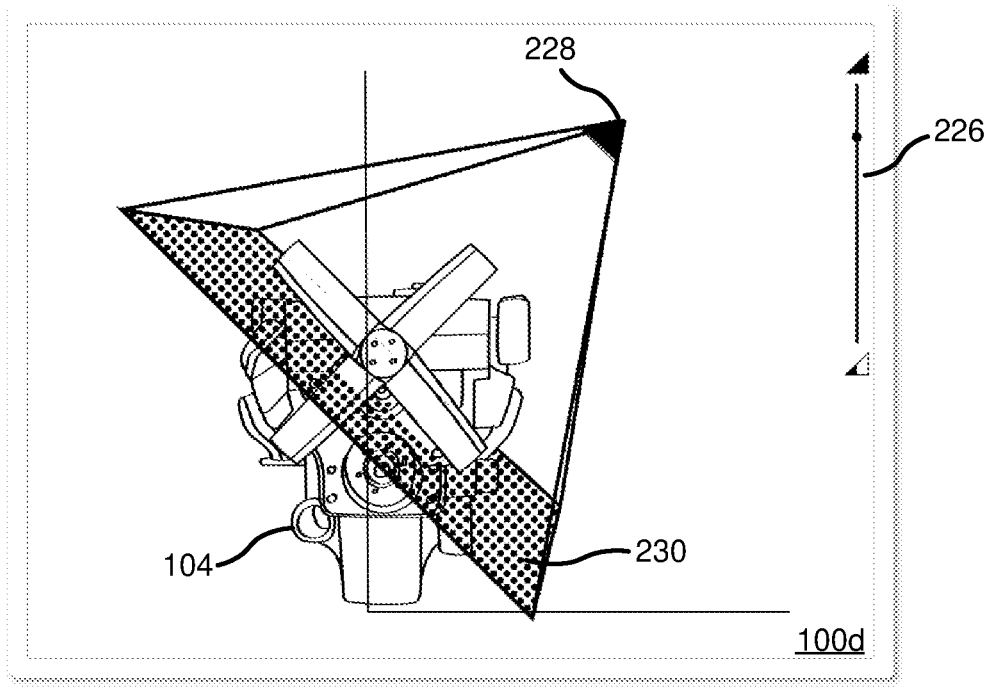
FIGS. 8a and 8b shows a depth plane adjustment feature of the user interface of the inspector station of FIG. 2 for adding annotations.
Figure 8B:
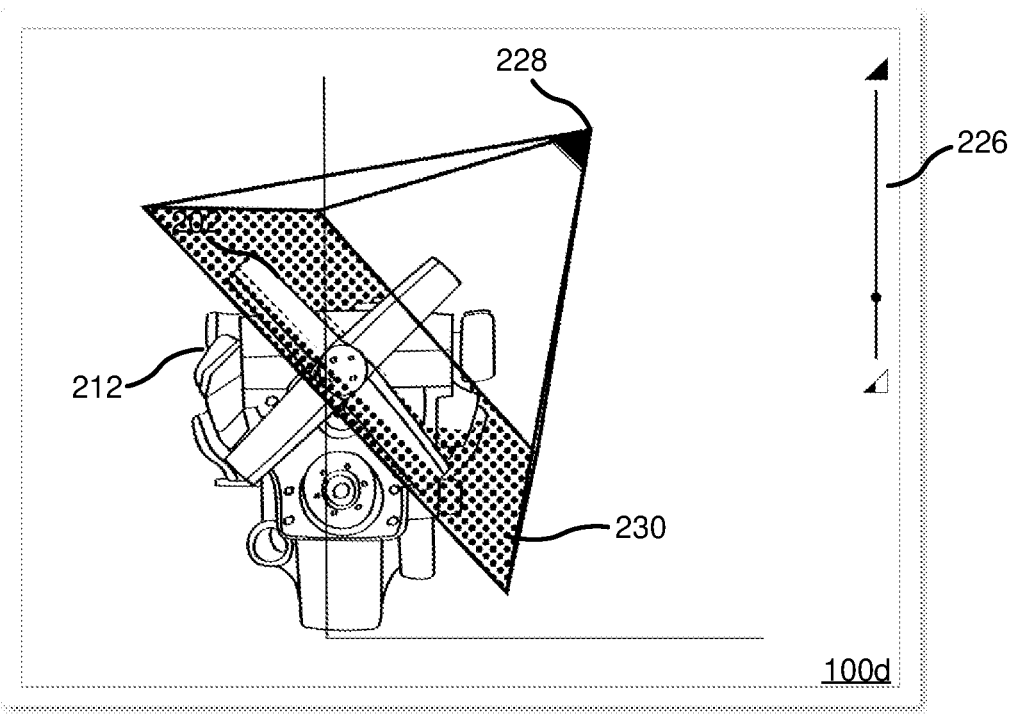

To provide an optimal amount of information to a worker, annotations are preferably augmented reality elements which will be superimposed on real time images of the workpiece displayed to the worker on WDC 40. To define such annotations, a depth plane control slider 226 is provided to the inspector to allow the inspector, as shown in FIGS. 8a and 8b, to place the annotations exactly where they wish in 3D space relative to the model of the workpiece. Specifically, the inspector defines a viewpoint fulcrum 228 and sets depth plane control slider 226 to a desired depth to locate the annotation plane 230 at a desired location, and then creates the annotation, using a drawing tool, a text tool, or other appropriate tool on annotation plane 230. It is contemplated that, in many cases, viewpoint fulcrum 228 will correspond to the camera location represented by apex 112 of one of the captured images, but viewpoint fulcrum 228 can be defined in other locations if desired. It should also be apparent that an inspector can define multiple annotations, from different viewpoint fulcrums 228 and/or at different depths, as desired. It should also be apparent that, while in the illustrated examples the annotations have been shown as 2D elements for clarity, annotations are not so limited and, in many circumstances, will be 3D elements. In particular, it is contemplated that such 3D elements can be used to identify regions or areas of the workpiece which the inspector wishes to inform, or remind, the worker are dangerous or otherwise off limits to the worker. For example, areas of high temperature or high voltage, or with dangerous moving parts, can be enclosed in annotations comprising 3D volumes such as cylinders or spheres which are displayed to the worker to warn them of such dangers. The inspector station 36 can save the annotations in 3D space relative to the model to maintain the annotations on the desired annotation plane. The annotations can be transmitted from the inspector station 36 to the WDC 40 via the server 24.

While annotations are, in many cases, preferably augmented reality elements (stored as 3D objects and positions in database 28), the present invention is not so limited and annotations can also include audio files, such as recordings of spoken questions, etc., or text files, etc. or combinations of such data.

Figure 10:
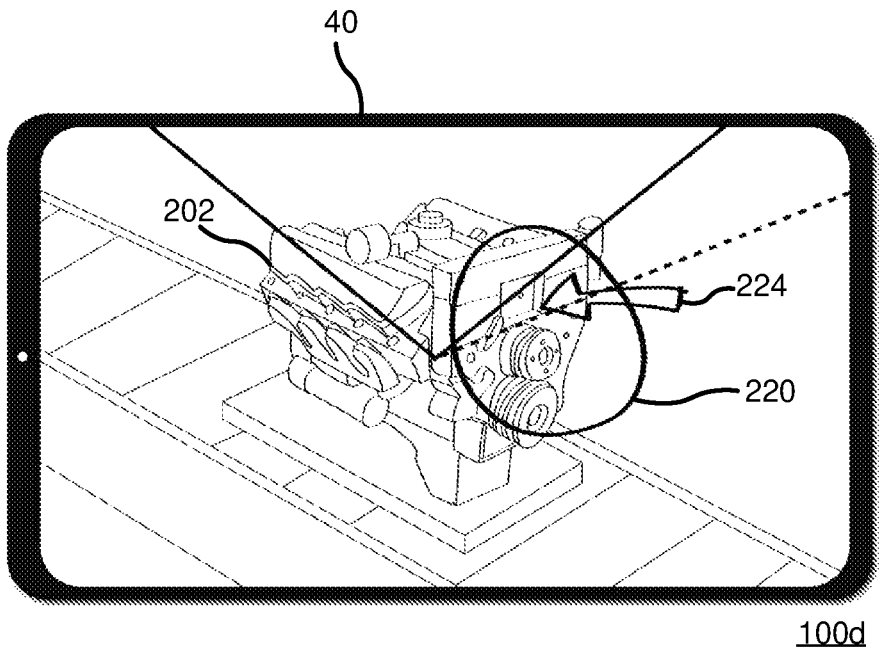

In the example of FIG. 7, and as best seen in FIG. 10, the inspector has added augmented reality annotations to the workpiece and the annotated information is sent back to WDC 40. Specifically, the inspector has pointed out the missing cooling fan by adding an annotation 220 identifying the missing part and has indicated the location for the missing part with annotation 224 to model 104, best seen in FIG. 10.

Figure 9:
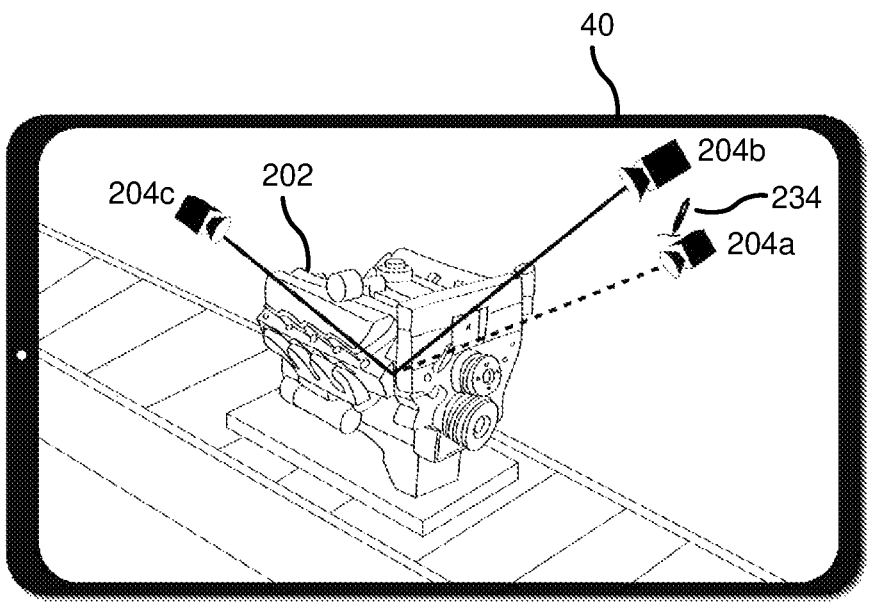
FIGS. 9 and 10 show other views of the user interface of the workpiece data capture device of FIG. 4, the view in FIG. 9 including an annotation indictor and the view in FIG. 10 including augmented reality annotations.

In the cases where an inspector annotates an image to advise a worker of an issue, WDC 40 will display a screen, shown in FIG. 9, which is similar to that of FIG. 6, wherein an icon 234, indicating one or more annotations, is displayed on the screen to indicate any captured images which have annotations defined for them. The worker can then select the annotation icon to see the annotations, which will be displayed as augmented reality elements on the real time image or view on WDC 40, which are related to the selected icon.

Figure 11:
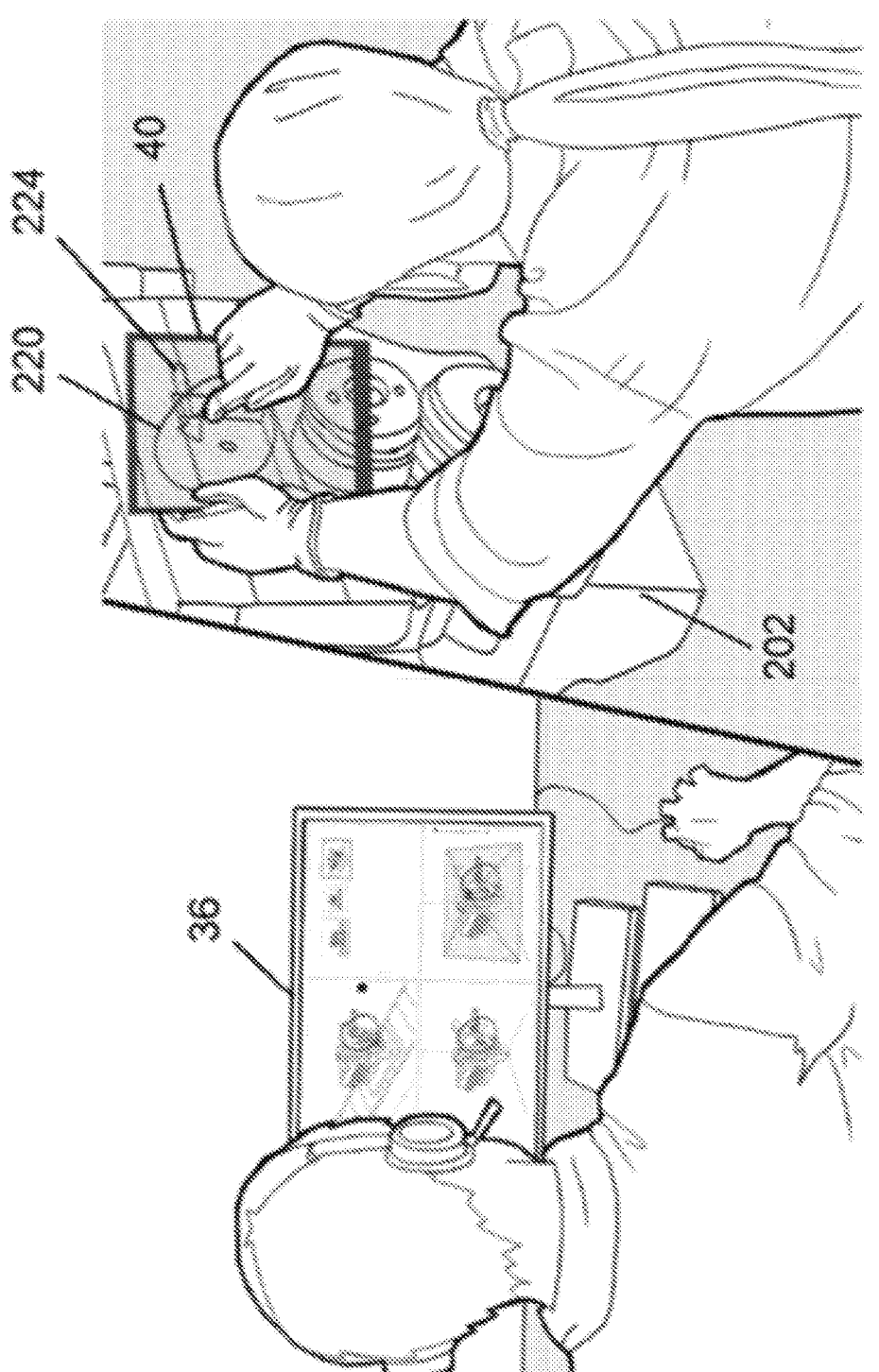
FIG. 11 graphically depicts the workflow between an inspector and a worker with the system of FIG. 1.

When selected, the annotations are preferably displayed on WDC 40 as augmented reality elements overlaid on the real time images of the actual workpiece, as shown in FIG. 10. Thus, as the worker moves WDC 40 about the workpiece, annotations 220 and 224 are superimposed with the real time view of the workpiece and the worker can more easily identify the issue, or issues, identified by the inspector, as indicated in FIG. 11. That is, WDC 40 can map the model of the workpiece onto its real time view to detect its orientation and display annotations at the appropriate locations in 3D space (i.e., on the defined annotation plane) as augmented reality elements over the real time view. If annotations were in another format, such as an audio recording, or a text message, etc., the annotations are appropriately rendered for the worker by WDC 40.

In cases where the worker may require additional guidance, or may wish to draw a specific condition or configuration to the attention of the inspector, the worker can create ad-hoc images to send to the inspector and/or can create one or more annotations and forward those annotations to the inspector for consideration. Depending upon the specific capabilities of WDC 40, such worker defined annotations may be augmented reality annotations, created in a similar manner to that described above for inspector created annotations, or may be still images, text files, audio recordings, etc.

When an issue has been identified by an inspector, the worker can then address the issue raised by the inspector by, in this example, installing the missing cooling fan. When the worker believes the identified issues has been addressed, the worker will then capture an updated image from camera position 204c for the inspector to re-inspect the workpiece to complete the inspection and approve the workpiece for any remaining stages of manufacture.

Figure 12:
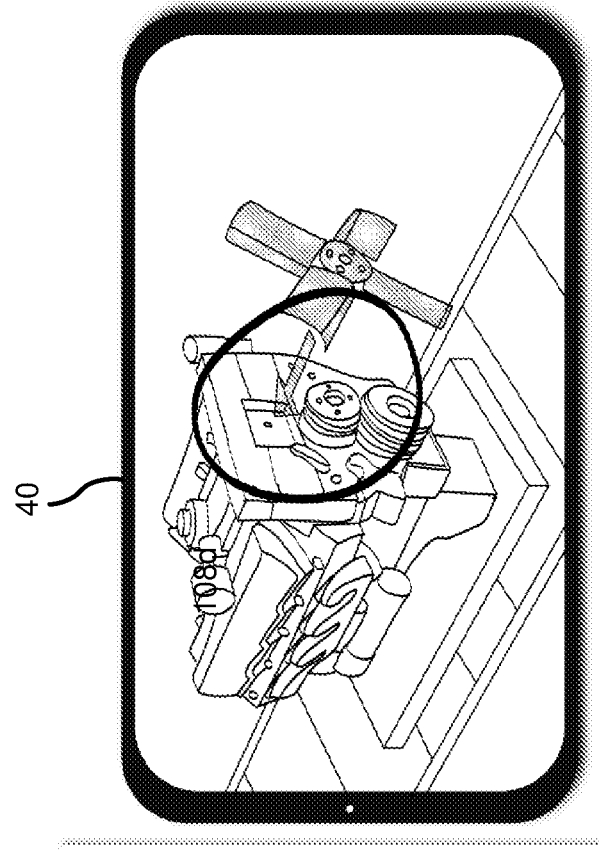
FIG. 12 shows a predefined annotation being sent to a worker.
Figure 12:
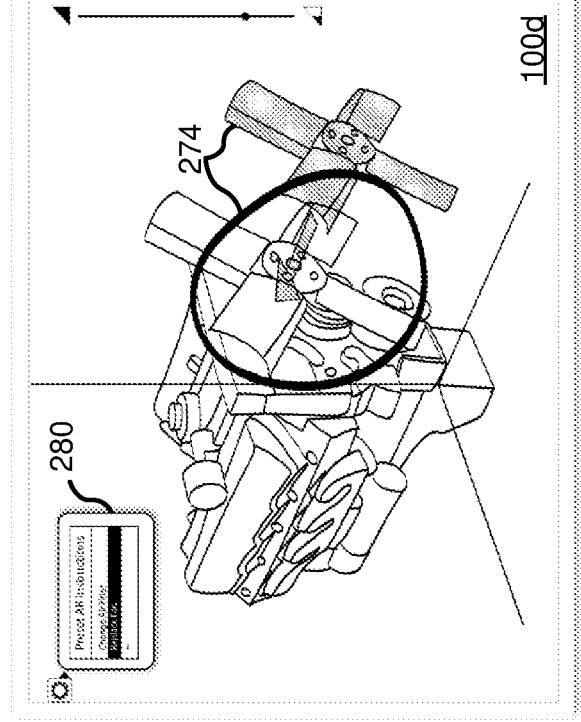

It is also contemplated that annotations can provide detailed instructions to allow a worker to perform a manufacturing step. In such a case, a predefined annotation can be provided to the worker and displayed on a captured image, or real time image, to instruct the worker how to perform a necessary manufacturing step. For example, an annotation representing a desired routing for wiring can be provided for the worker to use as a guide to achieve the necessary wiring of the manufacturing stage. FIG. 12 shows an example wherein the inspector selects a predefined annotation 274 (comprising a locating circle and a model of the cooling fan part) from a drop down menu 280 and sends that annotation 274 to the worker to instruct them how to change the cooling fan.

While the discussion above has focused on the process of inspecting a workpiece during manufacturing, the present invention is not so limited and, for example, the present invention can be employed to inspect regular maintenance or required service of a workpiece, or for the diagnosis and repair of an unexpected failure of a workpiece.

In the case of repair and/or diagnosis, the inspector can have the worker obtain any desired predefined or ad-hoc images the inspector requires to make his findings. The ad-hoc image capture process can be iterative, with the inspector requesting one or more ad-hoc images, either by specifying a desired image as described above, or by annotating an existing image for the workpiece to indicate the new image(s) the inspector desires, the worker capturing the requested images, the inspector examining the new images and requesting additional images, etc. When the inspector has made a determination of the fault and/or necessary repair, the inspector can send to the worker, via WDC 40, an annotated image and/or a manual or text description of the necessary repair or service steps.

Such repair or service operations can also have a predefined set of desired images defined for it, so that the inspector can oversee the repair or service operation to approve its completion.

As mentioned above, it is preferred that system 20 maintain copies of all captured images, annotations, etc. for each workpiece processed with system 20. Thus, when a workpiece is returned for service, or diagnosis and repair, the inspector will have access to the images previously captured for the workpiece and will thus be able to review images of each stage of the manufacture of the workpiece, as well as images of the workpiece each time it has been returned for service. It is contemplated that this will greatly simplify service and diagnosis of workpieces documented in this manner.

Figure 13:
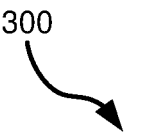
FIG. 13 shows a flowchart of an example method of inspecting a workpiece.
Figure 13:
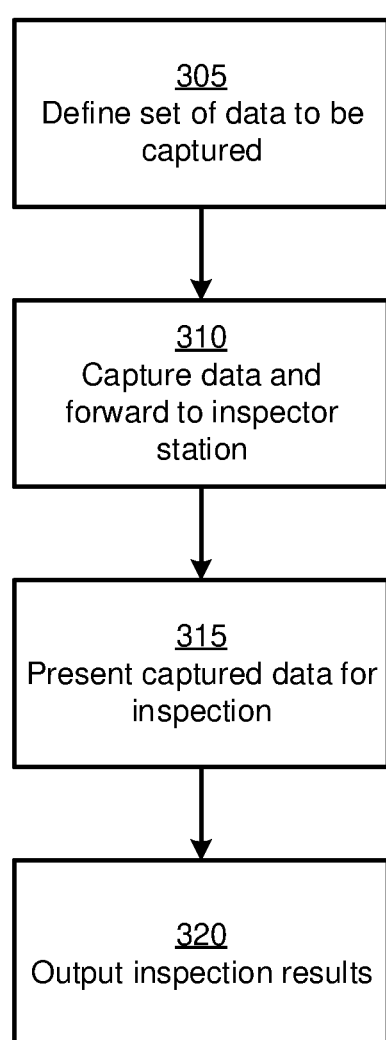

FIG. 13 is an example method 300 of inspecting a workpiece.

At block 305, a set of data to be captured to inspect the workpiece is defined. The set of data may be defined by an inspector at inspector workstation 36 and saved in an inspection template for the specific workpiece, or for the type of the workpiece. The defined set of data is saved at server 24 in database 28. The set of data can include at least one required image of the workpiece, to be obtained from a specified location.

At block 310, the data defined in the set is captured using WDC 40. A worker may operate WDC 40 to capture the data. The data can include images from the specified locations, videos, audio clips, and other data. The captured data is forwarded to inspector station 36.

At block 315, inspector station 36 presents the captured data to be inspected by an inspector. Inspector station 36 may display model 104 of the workpiece, a library of the set of data captured, a full resolution view of the image captured at the location, and a model with an overlay to show the plane of the image. Inspector station 36 allows for the inspector to navigate and interact with the models to understand the perspective from which the image of the workpiece was captured. Inspector station 36 can record additional data capture requests specifying additional data to be captured to complete inspection of the workpiece. Inspector station 36 can further record annotations of the image and/or the model. The annotations can be associated with a particular image and/or can be defined in 3D space relative to the model using an annotation plane.

At block 320, inspector station 36 outputs the inspection results. The inspection results can include the additional data to be captured, the annotations, other comments, or an approval of the workpiece. The inspection results can be sent to server 24 for storage in the database 28 or to WDC 40 to be presented to the worker to capture the additional data. The inspection results can be sent in real time as received at the inspector station 36.

As should also now be apparent, because the present system will quickly accumulate a large library of images of workpieces which have, inherently and/or explicitly, been categorized by professional inspectors, or machine learning systems, etc. as "acceptable", "in error", etc., the resultant database of images will constitute a superior training set of images for a machine learning system which can then be employed within system 20 to automate the inspection of some, or all, of the manufacturing stages for a workpiece. Further, images can be processed to extract serial and/or part numbers, to construct synthetic views, 3D models, etc.

The present invention provides a system and method for inspection maintenance and/or diagnosis of a variety of workpieces. The system serves workers working on a workpiece and inspectors who are distal from the workers and/or can be used for remote training or workers or for advanced diagnosis and/or repair. The system preferably includes a template of a set of one or more predefined images of a workpiece under consideration which will be required by an inspector to perform their inspection or diagnosis, etc.

The set of predefined required images is provided to the worker who captures them with an appropriate workpiece data capture device and the captured images are provided to the inspector for review. The inspector examines the provided images: approves the workpiece based on their content; requests one or more additional images to further examine aspects of the workpiece; and/or provides annotations and other information to the worker to address identified issues.

The system maintains, for each processed workpiece, a record of all captured images, annotations and related information as a workpiece history. Images can include camera images, X-ray images, depth and/or spatial data, etc. Workers and inspectors can be co-located, or can be located at different locations and, in this latter case, an inspector can serve workers in different facilities. Further, the system can operate in real time, with workers and inspectors exchanging information in a real time manner, or can be employed asynchronously, with a worker capturing images for subsequent consideration by an inspector. In this latter manner, inspectors and workers can be in different locations, countries, time zones, etc.

The above-described embodiments of the invention are intended to be examples of the present invention and alterations and modifications may be effected thereto, by those of skill in the art, without departing from the scope of the invention which is defined solely by the claims appended hereto.

We claim:

1. A system for inspection of a workpiece, the system comprising:

a database configured to store at least one inspection template defining, for a workpiece, a set of data to be captured to inspect the workpiece, the set of data including a set of required images, each required image associated with a specified viewpoint relative to a model of the workpiece;

a workpiece data capture device communicating with the database, the workpiece data capture device configured to:

receive the at least one inspection template;

present, on a live view of the workpiece, a graphical capture guide corresponding to the specified viewpoint of a selected required image, the graphical capture guide defining a target camera pose relative to the workpiece;

determine a current camera pose of the workpiece data capture device relative to the workpiece;

present, on the live view, an alignment indication representing a relationship between the current camera pose and the target camera pose, including presentation of any inspection annotations referenced to the model; and capture the selected required image responsive to alignment of the current camera pose with the target camera pose; and an inspector station configured to:

present captured images in association with the model;

generate, based on a selected view of the model, an additional image capture request defining a corresponding specified viewpoint; and generate at least one inspection annotation referenced to the model.

2. The system of claim 1, wherein the at least one inspection template defines at least two manufacturing stages for which the inspection is to be performed and the data to be captured at each of the at least two manufacturing stages.

3. The system of claim 1, wherein the data further includes one or more of: depth information, audio recordings, videos and text-based forms.

4. The system of claim 1, wherein to present the captured images in association with the model, the inspector station is configured to:

display, in a model pane, the model; and display, in a library pane, the set of data defined in the at least one inspection template for the workpiece.

5. The system of claim 4, wherein, the inspector station is further configured to display in an image capture pane, in response to a selection of one of the captured images, the model and an overlay indicating a location where the one of the captured images was captured.

6. The system of claim 5, wherein the overlay comprises a pyramid, wherein an apex of the pyramid indicates the location where the one of the captured images was captured, and a base of the pyramid indicates a plane of the one of the captured images at the location.

7. The system of claim 6, wherein the inspector station is further configured to present, in an image viewing pane, a full resolution view of the one of the captured images at the location.

8. The system of claim 1, wherein the inspector station is further configured to define a viewpoint fulcrum, define a depth relative to the viewpoint fulcrum to locate an annotation plane, and define the at least one inspection annotation on the annotation plane.

9. The system of claim 8, wherein the workpiece data capture device is configured to present the inspection annotations as augmented reality elements on the live view.

10. The system of claim 1, wherein the database is further configured to store, for each of the captured images, an associated camera pose relative to the model of the workpiece, and wherein the stored captured images and associated camera poses form a geometrically consistent data set usable for an automated inspection analysis.

11. A method of inspecting a workpiece, the method comprising:

defining a set of required images to be captured to inspect the workpiece, each required image associated with a specified viewpoint relative to a model of the workpiece;

presenting, on a live view of the workpiece, a graphical capture guide corresponding to the specified viewpoint of a selected required image, the graphical capture guide defining a target camera pose relative to the workpiece;

determining a current camera pose of a workpiece data capture device relative to the workpiece;

presenting, on the live view, an alignment indication representing a relationship between the current camera pose and the target camera pose;

capturing, at the workpiece data capture device, the selected required image responsive to alignment of the current camera pose with the target camera pose;

presenting, at an inspector station, captured images in association with the model; and generating inspection results, the inspection results comprising one of:

an additional image capture request defining a corresponding specified viewpoint; and an approval of the workpiece.

12. The method of claim 11, wherein presenting the captured images comprises:

displaying the model; and displaying a library of data including the captured images.

13. The method of claim 12, further comprising displaying, in response to a selection of one of the captured images from the library of data, the model and an overlay indicating a location where the one of the captured images was captured, the overlay comprising a pyramid, wherein an apex of the pyramid indicates the location where the one of the captured images was captured, and a base of the pyramid indicates a plane of the one of the captured images at the location.

14. The method of claim 13, further comprising presenting a full resolution view of the one of the captured images at the location.

15. The method of claim 11, further comprising:

Defining, relative to the model of the workpiece, a viewpoint fulcrum;

defining a depth relative to the viewpoint fulcrum to locate an annotation plane; and defining an annotation on the annotation plane.

16. The method of claim 15, further comprising displaying, at the workpiece data capture device, the annotation as an augmented reality element on the live view.

17. The method of claim 11 further comprising:

storing, for each of the captured images, an associated camera pose relative to the model of the workpiece, the stored captured images and associated camera poses forming a geometrically consistent data set for an automated inspection analysis.

\* \* \* \* \*